United States Patent Office 3,162,599
Patented Dec. 22, 1964

3,162,599
GASOLINE PURIFICATION BY POLYMERIZATION
William McArthur and Alan Marchant, Norton-on-Tees, England, assignors to Imperial Chemical Industries Limited, London, England, a corporation of Great Britain
No Drawing. Filed Apr. 10, 1962, Ser. No. 186,351
Claims priority, application Great Britain, Apr. 13, 1961, 13,355/61
8 Claims. (Cl. 208—255)

This invention relates to the treatment of mixtures of liquid hydrocarbons for the purpose of obtaining gasoline and other valuable products.

Mixtures of liquid hydrocarbons of wide boiling range such as are obtained from naphtha cracking and coal-tar distillation, contain, in addition to a gasoline fraction, olefinic material which is susceptible to polymerization. This material usually comprises a wide range of compounds including acyclic mono- and di-olefines such as butenes, butadiene, isoprene and piperylene and styrene, and cyclic mono-olefines such as indene, and cyclic diolefines such as cyclopentadiene and its homologues, all of which are susceptible to polymerization to a greater or lesser degree.

It is preferable to separate this olefinic material because otherwise it may form gum in the gasoline by polymerizing. The present invention provides a process in which this material is separated in a commercially valuable form.

Accordingly the present invention provides a process for the recovery of purified gasoline and other valuable products from a crude gasoline feedstock containing polymerizable olefinic material, including cyclic and acyclic conjugated diolefines, which process comprises, in succession selectively polymerizing the conjugated cyclic diolefines in the mixture, separating low boiling material without substantially decomposing the polymerized residue, polymerizing the conjugated acyclic diolefines in the separated low boiling material and separating gasoline therefrom.

The high boiling residue from the first separation comprises polymerized cyclic diolefines such as cyclopentadiene and methyl cyclopentadiene, chiefly as dimers and combined as co-dimers with one another and with acyclic conjugated diolefines such as isoprene and piperylene. In addition, other high boiling material such as indene, styrene, and other acyclic olefines containing about 8 carbon atoms or more is usually present in the residue. This is valuable as a resin former, since it is substantially free from high polymers of the cyclic components and also from uncombined lower acyclic olefine monomers or polymers, owing to the selective nature of the first polymerization step and the immediately following separation step.

The gasoline-free residue from the second separation is a mixture of polymers of such acyclic olefines as isoprene, piperylene, butadiene and other cyclic conjugated diolefines having less than about 8 carbon atoms. This residue is a valuable substitute for linseed oil in the paint industry. The gasoline obtained from the second separation is of high grade, with very little tendency to form gum in comparison with the untreated hydrocarbon mixture.

The polymerization steps are preferably effected by heating under sufficient pressure to maintain the mixture liquid.

In the first such step, the cyclic diolefine components of the mixture are more susceptible than the other components to polymerization, and they may therefore be selectively polymerized, chiefly to dimers and co-dimers as described, by heating at moderate temperatures, preferably between about 100° and 150° C., at which the other components are largely unchanged.

The second polymerization step may also be effected by heating, but at higher temperatures, preferably between about 200° and about 300° C., for example about 250° C., in order to effect polymerization of the acyclic conjugated diolefines at an effective rate.

The separation steps are preferably effected by distillation. The first such step must be effected without incurring to any substantial extent any further appreciable change in the distillate or residue by polymerization or depolymerization. It may, however, otherwise be carried out over a relatively wide temperature range, preferably between 120° C. and 160° C. The effect on the hydrocarbon mixture of the selective polymerization of the cyclic conjugated diolefines is thus unimpaired, and the high boiling residue from the first step contains substantially no polymers other than those of cyclic diolefines, these polymers being chiefly dimers and co-dimers as previously described, together with high boiling monomers of other olefines. The first separation step may be effected by distillation for example by flash distillation, or by distillation at temperatures at which further polymerization, or depolymerization of dimers and co-dimers present, cannot occur to any appreciable extent.

The second separation step may be carried out under less critical conditions than those of the first, but again flash distillation or equivalent methods are preferred in which substantially no further depolymerization occurs. The upper boiling limit of the gasoline thus recovered may be varied between wide limits according to the quality of gasoline desired. Preferably, however, the second separation step is effected by distillation above 200° C., for example 220° C. The gasoline fraction may be treated for the recovery of further components, such as aromatic compounds, or it may be used for other purposes.

Each polymerization step may be effected at a suitable elevated temperature under pressure which is then released to effect the successive separation step by distillation of the volatile components in the product.

The process of the invention may be carried out as a batchwise or as a continuous operation.

An advantage of the process according to this invention is that since the feed to the second polymerization step is a raffinate, it is relatively free from high boiling colored substances, these being left in the residue from the first separation step. The polymer product obtained from the second polymerization is therefore obtained free from dark color.

The resin formers provided by the present invention as residue from the first separation step comprise mixtures, which are believed to be novel, of high boiling acyclic olefines and polymers, chiefly dimers, of cyclic diolefines, and one substantially free from acyclic conjugated diolefine monomers or polymers. The mixtures may be treated in any convenient fashion, for example with aluminum chloride, to yield by catalyzed polymerization novel crystalline resins of high melting point which are soluble in carbon tetrachloride and hydrocarbons but insoluble in alcohols.

*Example 1*

In this example the feedstock was a hydrocarbon mixture comprising the liquid product, boiling below about 170° C., from steam-cracked naphtha. The specific gravity of the feedstock, which was pale yellow, was 0.761, and it contained by weight 3.8% cyclopentadiene, 3% methylcyclopentadiene, 2.7% isoprene and 2.1% piperylene, the remainder being chiefly paraffins, benzene and substituted benzenes such as toluene and xylenes, with a little ethyl benzene and styrene, and mono-olefines. The feedstock was passed at 120° C. and 150 pounds per square inch gauge through a ½ inch diameter converter tube of about 2.4 liters capacity at a rate giving a residence time of about 2 hours. About 1 liter of the liquid effluent from the converter was flash-distilled at atmospheric pressure to separate material boiling below about 140° C. The remaining residue was a dark yellow liquid about 12.1% by weight of the product, with a specific gravity of 0.915 and contained 35% by weight of cyclopentadiene and methylcyclopentadiene in the form of dimers and co-dimers with one another and with acyclic olefines such as isoprene and piperylene.

The raffinate from this first separation step, boiling below about 140° C. and comprising about 88% by weight of the feedstock treated, was substantially colorless, with a specific gravity of 0.75 and contained by weight 0.5% methylcyclopentadiene, 0.6% cyclopentadiene and substantially no dimer of either, 2.8% isoprene and 2.3% piperylene.

The raffinate was passed at 250° C. and 400 pounds per square inch gauge through a second reactor, similar to the first, and at a similar rate. The effluent liquid was flash-distilled at atmospheric pressure to remove gasoline as a second raffinate boiling below about 140° C. This second raffinate was about 87.7% by weight of the first, or about 76% of the total feedstock treated, was substantially colorless with a specific gravity of 0.751, and contained aromatic and mono-olefinic hydrocarbons in addition to paraffins but only 0.4% isoprene and 0.7% piperylene by weight, and substantially no monomers, dimers or co-dimers of cyclic diolefines. The residue from this second separation step was a pale yellow liquid with a specific gravity of 0.957.

*Example 2*

50 grams of the liquid residue from the first separation step in the above example were stirred at 85° C. for 10 minutes with 1% by weight of anhydrous aluminium trichloride. The resultant dark colored liquid was neutralized with aqueous caustic soda solution, and after separating the aqueous layer a yellow organic layer was obtained. This was washed several times with water and treated with methanol to precipitate the resin as a pale yellow solid weighing 25 grams and with a softening point of 151° C.

*Example 3*

An aluminium chloride polymerization complex was prepared by passing dry hydrogen chloride through a mixture of toluene and aluminium chloride at 80° C. for 1½ hours. On cooling, a brown oil containing approximately 30% by weight of aluminium chloride was separated from the toluene, and 6.4 parts were slowly added with stirring to 100 parts of the residue from the first separation step, containing cyclic conjugated diolefine dimers and heavy ends, the temperature being maintained at about −6° C. The reaction was continued for 2.7 hours, and then stopped by addition of excess ammonia liquor (0.88 S.G.) which broke down the catalyst complex. If necessary, the reaction may be kept conveniently mobile during the reaction by the addition of sufficient hexane or other suitable solvent.

The ammonia and solvent were then distilled off, and the residue extracted with petroleum ether to dissolve the resin product, any insoluble material being separated by filtration. Finally, the petroleum ether was distilled from the resin product.

The resins from Examples 2 and 3 were found to be suitable for use in the manufacture of floor tiles.

*Example 4*

A drying oil was prepared from the residue left after the second separation in Example 1 by forming a 1:1 mixture of linseed oil and the residue, and adding 0.5% lead and 0.002% cobalt driers. The oil was tested by painting it on aluminium foil which was then stove-dried at 60° C. and 60% relative humidity. The film skin-dried in 2 days, and was then extracted with n-hexane, and with benzene in a Soxhlet apparatus. The weight of the two soluble fractions, and the final insoluble, so-called "linoxyn" fraction, were determined, and found to be 16%, 46% and 38% of the original, showing that the residue may be used partially to substitute linseed oil in drying oils. Higher stoving temperatures for longer periods at higher temperatures gave an increased "linoxyn" fraction, closer to that for linoleum, thus indicating that the residue was suitable for use in the manufacture of linoleum.

We claim:

1. A process for the recovery of purified gasoline and other valuable products from a crude gasoline feedstock containing polymerizable olefinic material including cyclic and acyclic conjugated diolefines which comprises in succession selectively polymerizing the conjugated cyclic diolefines in the mixture at a temperature of 100 to 150° C., separating low boiling material without substantially decomposing the polymerized residue, polymerizing the conjugated acyclic diolefines in the separated low boiling material at a temperature of 200 to 300° C., and separating gasoline therefrom.

2. A process according to claim 1 wherein the crude gasoline feedstock is a crude gasoline fraction obtained by steam-cracking naphtha.

3. A process according to claim 1 in which the separation steps are carried out by flash distillation.

4. A process according to claim 1 in which the separation steps are carried out by distillation, the first within the range 120° C. to 160° C., and the second above 200° C.

5. A process according to claim 1 in which the polymerization steps are carried out under at least sufficient pressure to keep the feed liquid.

6. A process according to claim 5 in which the separation steps are carried out by releasing the pressure after the preceding polymerization step.

7. A process according to claim 6 in which each polymerization step is carried out for about 2 hours.

8. A composition comprising a mixture of polymerized cyclic conjugated diolefines and higher mono-olefine monomers said mixture being substantially free from lower acyclic conjugated diolefines.

References Cited by the Examiner
UNITED STATES PATENTS

| | | | |
|---|---|---|---|
| 2,180,324 | 11/39 | Osterstrom | 208—255 |
| 2,225,172 | 12/40 | Hancock | 208—255 |
| 2,260,619 | 10/41 | Hancock | 208—255 |

ALPHONSO D. SULLIVAN, *Primary Examiner.*